United States Patent
Ohtsuka et al.

(10) Patent No.: US 9,067,175 B2
(45) Date of Patent: Jun. 30, 2015

(54) METHOD AND APPARATUS FOR REMOVING LOW-CONCENTRATION METHANE

(75) Inventors: Hirofumi Ohtsuka, Ikoma (JP); Tsutomu Sakai, Takatsuki (JP)

(73) Assignee: Osaka Gas Co., Ltd., Osaka (JP)

( * ) Notice: Subject to any disclaimer, the term of this patent is extended or adjusted under 35 U.S.C. 154(b) by 758 days.

(21) Appl. No.: 13/388,588

(22) PCT Filed: Sep. 15, 2010

(86) PCT No.: PCT/JP2010/065956
§ 371 (c)(1),
(2), (4) Date: Apr. 12, 2012

(87) PCT Pub. No.: WO2011/037056
PCT Pub. Date: Mar. 31, 2011

(65) Prior Publication Data
US 2012/0189523 A1 Jul. 26, 2012

(30) Foreign Application Priority Data

Sep. 25, 2009 (JP) ................ 2009-221225
Mar. 9, 2010 (JP) ................ 2010-052308

(51) Int. Cl.
| | | |
|---|---|---|
| *B01D 53/56* | (2006.01) | |
| *B01D 53/86* | (2006.01) | |
| *B01J 23/46* | (2006.01) | |
| *F23G 5/46* | (2006.01) | |
| *F23G 5/50* | (2006.01) | |
| *F23G 7/07* | (2006.01) | |
| *B01J 21/06* | (2006.01) | |
| *B01J 23/42* | (2006.01) | |
| *B01J 35/04* | (2006.01) | |

(52) U.S. Cl.
CPC ........ *B01D 53/8668* (2013.01); *B01D 2251/11* (2013.01); *B01D 2255/1021* (2013.01); *B01D 2255/1028* (2013.01); *B01D 2255/20707* (2013.01); *B01D 2255/20715* (2013.01); *B01D 2257/7025* (2013.01); *B01D 2259/65* (2013.01); *B01J 21/063* (2013.01); *B01J 21/066* (2013.01); *B01J 23/42* (2013.01); *B01J 23/468* (2013.01); *B01J 35/04* (2013.01); *F23G 5/46* (2013.01); *F23G 5/50* (2013.01); *F23G 7/07* (2013.01); *F23G 2206/10* (2013.01); *Y02C 20/20* (2013.01)

(58) Field of Classification Search
CPC .......... B01D 53/02; B01D 53/56; B01J 8/00; C07C 11/24
See application file for complete search history.

(56) References Cited

U.S. PATENT DOCUMENTS 7,364,712 B2 4/2008 Ohtsuka et al.

FOREIGN PATENT DOCUMENTS

| | | | |
|---|---|---|---|
| JP | 61151013 | A | 7/1986 |
| JP | 62254826 | A | 11/1987 |
| JP | 200174205 | A | 3/2001 |
| JP | 2003247420 | A | 9/2003 |
| JP | 2006312143 | A | 11/2006 |
| JP | 2008246473 | A | 10/2008 |
| JP | 2009112912 | A | 5/2009 |
| JP | 201024340 | A | 2/2010 |
| WO | 0240152 | A1 | 5/2002 |

OTHER PUBLICATIONS

Jog H. Lee et al., "The catalytic combustion of methane and hydrogen sulphide", Catalysis Today,1999, pp. 353-357, vol. 47.
M.S. Jennings et al., "Catalytic Incineration for Control of Volatile Organic Compound Emissions", 1985, pp. 2-17, Noyes Publications, Park Ridge, New Jersey.
Shi Su and Agnew., "Catalytic combustion of coal mine ventilation air methane", Fuel, 2006, pp. 1201-1210, vol. 85.
Shi Su et al. "An assessment of mine methane mitigation and utilisation technologies", Progress in Energy and Combustion Science, 2005, pp. 123-170, vol. 31.
Toshihiko Sakurai, "Catalyst", 1993, pp. 304-311, vol. 35. (English-language Abstract on p. 311).

*Primary Examiner* — Edward Johnson
(74) *Attorney, Agent, or Firm* — The Webb Law Firm

(57) ABSTRACT

Disclosed are a method and an apparatus for removing methane from a gas which contains the methane at such a low concentration as not to be rendered into a combustible range with whatever ratio of air mixed therewith. In order to ensure satisfactory methane removal performance even in the coexistence of sulfur compound and in order also to provide stable methane removal performance for an extended period of time without performance deterioration even when the methane concentration varies significantly, the gas is fed to a heat exchanger for preheating and methane is exposed to an oxidation catalyst which oxidizes the methane through contact therewith. Then, the resultant gas is fed again to the heat exchanger for heat recovery through heat exchange with un-reacted gas. Further, the flow rate of gas to be treated is varied, according to a concentration of the methane contained in this treated gas.

19 Claims, 8 Drawing Sheets

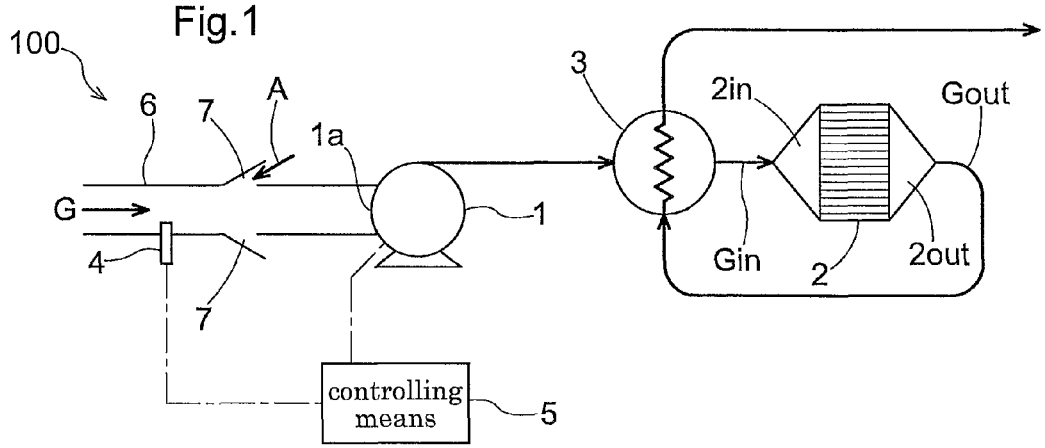
Fig.1
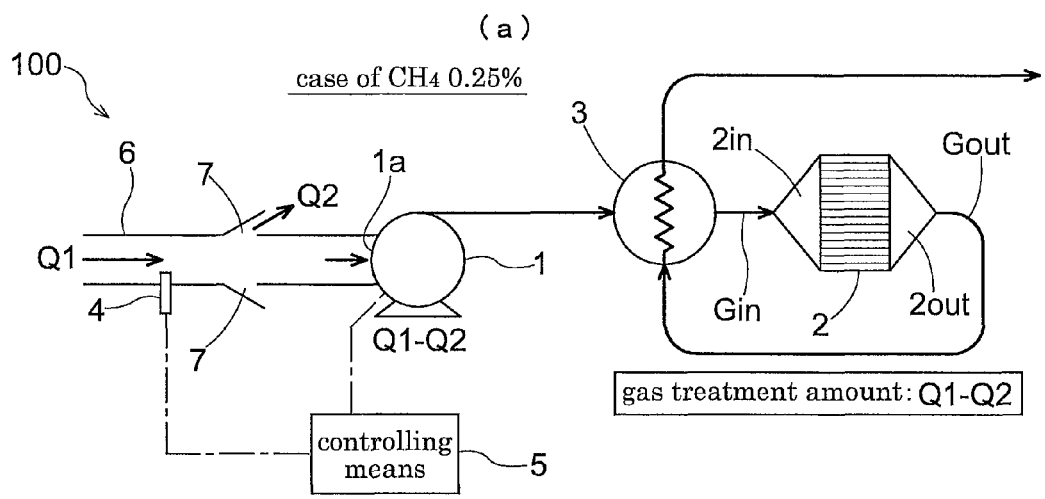
Fig.2 (a)
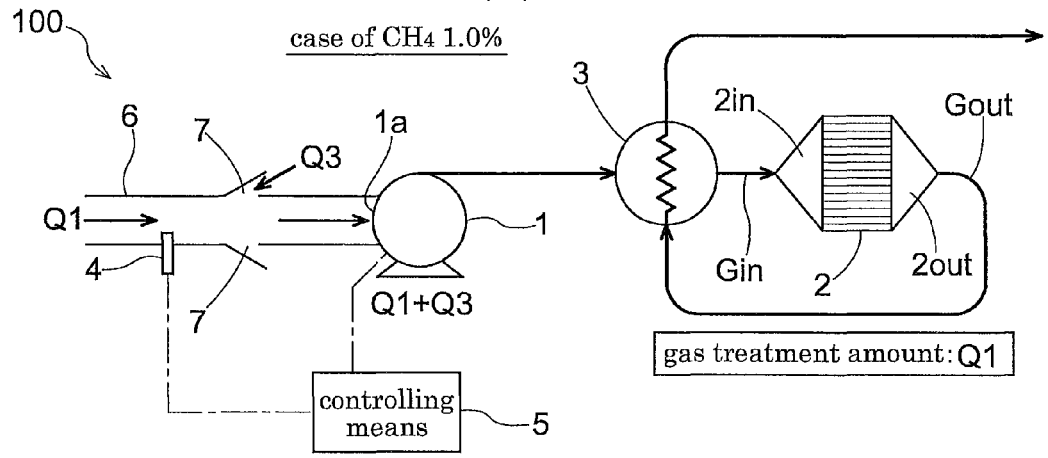
(b)

METHOD AND APPARATUS FOR REMOVING LOW-CONCENTRATION METHANE

TECHNICAL FIELD

The present invention relates to a method and an apparatus for removing methane from a gas such as a coal mine ventilation gas that contains methane at such a low concentration which is lower than a lower limit of the combustion limit (explosion limit) of methane and which is too low to be rendered into its combustible range with whatever ratio of air mixed therewith.

BACKGROUND ART

A bed of coal contains a great amount of methane adsorbed therein and an effective utilization thereof is now underway. Methane collected from an un-mined coal bed by e.g. drainage has a relatively high methane concentration ranging from 30% to 95%. Hence, its effective utilization is relatively easy through concentration or the like. Whereas, a gas discharged through ventilation of a coal mine has only a low concentration of methane ranging from 0.1 to 1%, so that most of it is discharged into the atmosphere. Although methane is not harmful for human bodies, it provides a high global warming effect. Therefore, there is a need for reducing its discharge amount. However, when a low concentration gas such as coal mine ventilation gas is to be concentrated, this concentrating process involves therein passage of the gas through the explosion limit (from 5 to 15%) of methane. Hence, there is a significant concern about safety and the process is not feasible. For this reason, there have been proposed methods of using such gas as combustion air for a gas engine or turbine or methods of oxidization removal by such technique as catalytic oxidization (Non-Patent Documents 1, 2).

In treatment of gas containing an organic compound at a low concentration, according to a process often employed in treatment of an exhaust gas generated from an industrial process containing a volatile organic compound (VOC), an oxidization catalyst and a heat exchanger are employed in combination and preheated gas is fed to the catalyst for removing the organic compound contained in the gas through a catalytic oxidization reaction (Non-Patent Documents 3, 4). This process employs a catalyst usually comprising Pt or Pd supported on an aluminum support. The target substances to be treated by this VOC treatment process are normally compounds that can be oxidized relatively easily, such as toluene, acetone, ethyl acetate. These can be oxidized relatively easy with using the above catalyst at a low temperature of 350° C. or lower.

However, methane is the most stable compound among hydrocarbons. So, with the above-described catalysts, oxidization removal of methane is difficult at low temperatures of 400° C. or lower. For instance, in Non-Patent Document 2, it is shown that satisfactory methane removal performance cannot be obtained unless the methane concentration is at least about 0.3% and even in the case of methane concentration of 0.423%, satisfactory performance cannot be obtained unless the catalyst inlet temperature is 490° C. or higher. In order to preheat coal mine ventilation gas at ambient temperature and in a great amount thereof, a heat exchanger with a large capacity is required, so there arises the problem of inferior economic performance. Further, in case the catalyst inlet temperature is about 500° C., with addition of reaction heat generated from oxidization of methane, the catalyst outlet temperature becomes from 600° C. to 700° C. This is not only detrimental to the durability of catalyst, but also causes another problem of additional costs of piping and the heat exchanger due to heat resistant temperature requirement.

Due to sulfur compounds present in coal, coal mine ventilation gas contains trace amounts of sulfur compounds (hydrosulfide, methyl mercaptan, dimethyl sulfide, sulfur oxide, etc.) These are strong catalyst poisons, which makes catalytic oxidization of methane at low temperatures even more difficult. For instance, Lee et al, studied the effect of hydrogen sulfides on methane oxidation using a Pd catalyst and revealed that in coexistence of hydrogen sulfide of 26 ppm, 50% methane removal temperature rises as much as 200° C. or more, from 360° C. to 580° C. (Non-Patent Document 5).

As oxidization removal catalysts for methane contained in combustion exhaust gas, there are known a catalyst comprising iridium and platinum supported on a zirconia support and a catalyst comprising iridium and platinum supported on a titania support (Patent Documents 1, 2). With these catalysts, oxidization removal of methane is possible at a relatively low temperature ranging from 350 to 400° C. approximately, even in the coexistence of sulfur dioxide, in addition to high concentration of steam. However, the coal mine ventilation gas treatment with these catalysts suffer the following shortcomings.

Firstly, there is a need for ensuring resistance of the catalyst against reducing sulfur compounds such as hydrogen sulfide and mercaptan. Generally, it is believed that in poisoning by sulfur compounds, a reducing sulfur compound whose sulfur atoms per se can be coordinated at the active site provides stronger poisoning.

Further, the concentration of methane present in the coal mine ventilation gas varies widely from 0.1 to 1% and also prediction of its variation behavior is difficult. So, with simple use of a heat exchanger and a catalyst in combination, the gas temperature at the catalyst inlet will be reduced so that sufficient removal performance cannot be obtained. Conversely, in the event of sharp rise in the methane concentration, there occurs a sharp and sudden rise in the catalyst layer temperature within a short period of time, which leads to irreversible deterioration of catalyst activity. Especially, when there occurs a sharp rise in the methane concentration, the catalyst inlet temperature too will rise due to the effect of heat exchange, which in turn invites further rise in the catalyst layer temperature. As a result, there occurs a sharp rise in the catalyst layer temperature within a short period of time, which may invite fatal destruction of the catalyst and/or the heat exchanger. Also known is a method that uses heating by a burner in addition to a heat exchanger, so that when the preheating temperature (=catalyst inlet temperature) has risen above a predetermined value, combustion of the burner is stopped, thus stabilizing the catalyst inlet temperature (Patent Document 3). However, as this method requires fuel for the burner, the running cost increases. Further, the method involves a process in which as the methane concentration increases, the catalyst outlet temperature rises, which in turn leads to rise of the catalyst inlet temperature. Hence, there occurs a significant lag from the increase in methane concentration to the detection of rise in the catalyst inlet temperature. As a result, in the event of sudden and rapid variation in the methane concentration, deterioration of catalyst activity is unavoidable.

PRIOR ART DOCUMENTS

Patent Documents

Patent Document 1: International Publication Gazette WO2002/040152

Patent Document 2: Japanese Unexamined Patent Application Publication No. 2008-246473
Patent Document 3: Japanese Unexamined Patent Application Publication No. 62-254826

Non-Patent Documents

Non-Patent Document 1: Shi su, et. al, "Progress in energy and combustion science", Vol. 31, p. 123-170 (2005)
Non-Patent Document 2: Shi su, et. al. and Jenny Agnew, "Fuel", Vol. 85, p. 1201-1201 (2006).
Non-Patent Document 3: Toshihiko Sakurai "Catalyst" Vol. 35, p. 304-311 (1993)
Non-Patent Document 4: M. S. Jennings, et. al, "Catalytic incinerations for control of volatile organic compound emissions", Noyes Publishing, New Jersey, U.S.A. (1985)
Non-Patent Document 5: J. H Lee, et., al, "Catalysis Today", Vol. 47, p. 353-357 (1999).

SUMMARY OF INVENTION

Object to be Achieved by Invention

In removing methane from a gas which contains the methane at such a low concentration as not to be rendered into a combustible range with whatever ratio of air mixed therewith, the object of the present invention is to provide a method and an apparatus for removing methane which ensure satisfactory methane removal performance even in the coexistence of sulfur compound and also to provide stable removal performance for an extended period of time without performance deterioration even when the methane concentration varies significantly.

Means for Achieving the Object

According to the first characterizing feature of a method of removing low concentration methane from a treatment-object gas which contains the methane at such a low concentration as not to be rendered into a combustible range with whatever ratio of air mixed therewith, the method comprises the steps of:
feeding the treatment-object gas through a heat exchanger for preheating the treatment-object gas;
feeding the resultant gas to an oxidization catalyst contact-oxidizing methane for a catalytic oxidization reaction; and
feeding the resultant reacted gas again through said heat exchanger together with an amount of un-reacted gas for recovery of heat from the reacted gas through heat exchange with the un-reacted gas;
wherein the method further comprises the step of varying the amount of gas to be fed to the oxidization catalyst in accordance with the concentration of the methane contained in the treatment-object gas in such a manner that the gas rate is increased when the methane concentration is high whereas the gas rate is decreased when the methane concentration is low.

With the above-described first characterizing feature of the present invention, in adopting an arrangement of providing a heat exchanger for recovering heat generated from methane removal from a gas to be fed to an oxidization catalyst, as the flow rate of gas to be fed to the oxidization catalyst is varied in accordance with the concentration of the methane contained in the treatment-object gas, it becomes possible to maintain the temperature of the oxidization catalyst appropriate. That is, when the methane concentration is low, the flow rate of gas to be fed to the oxidization catalyst is decreased, whereas, when the methane concentration is high, the flow rate of gas to be fed to the oxidization catalyst is increased. With this, variation of the temperature of the oxidization catalyst inlet can be restricted. Whereby, a high methane removal performance can be obtained and also the performance of the catalyst can be maintained for an extended period of time. Here, when the temperature of the oxidization catalyst inlet or the oxidization catalyst outlet is referred to, this represents also the temperature of the gas at such portions.

Preferably, the oxidization catalyst for use in the above described low temperature methane removing method comprises iridium and platinum supported on a support comprised of zirconia, titania or a mixture thereof.

This catalyst is capable of oxidizing methane even at a temperature of 350° C. approximately and as the reduction of its activity due to sulfur compound is low, there is no need to increase the capacity of the heat exchanger, thus being advantageous economically.

Further preferably, in connection with a gas treatment amount as a flow rate of the gas to be treated by the oxidization catalyst,
there is provided, as a first concentration, a methane concentration where the temperature of the oxidization catalyst inlet becomes a permissible lower limit temperature of the oxidization catalyst when the total amount of the treatment-object gas is treated by the oxidization catalyst with the gas treatment amount being kept constant: and
when the methane concentration of the treatment-object gas is lower than said first concentration, said amount of gas to be fed to the oxidization catalyst is restricted such that the gas treatment amount is decreased in response to reduction in the methane concentration.

As will be explained later with reference to FIG. 8 and FIG. 9, in the case of the present arrangement of providing a heat exchanger for recovering heat generated from the oxidization removal and guiding this heat to the oxidization catalyst, if the total amount of treatment-object gas is treated as it is by the oxidization catalyst with keeping the gas treatment amount constant, the temperature of the oxidization catalyst inlet drops in association with reduction in the methane concentration of the treatment-object gas. And, if the temperature of the oxidization catalyst inlet drops below the permissible lower limit temperature, the oxidization catalyst cannot achieve satisfactory removal performance. On the other hand, in case the amount of gas to be fed to the oxidization catalyst is restricted for reducing the gas treatment amount, drop of the temperature of the oxidization catalyst inlet can be avoided, so that a favorable operation can continue.

Further, preferably, in connection with a gas treatment amount as a flow rate of the gas to be treated by the oxidization catalyst,
there is provided, as a second concentration, a methane concentration where the temperature of the oxidization catalyst outlet becomes a permissible upper limit temperature of the oxidization catalyst when the total amount of the treatment-object gas is treated by the oxidization catalyst with the gas treatment amount being kept constant: and
when the methane concentration of the treatment-object gas is higher than said second concentration, in addition to the treatment-object gas, an amount of air is fed separately to the oxidization catalyst so as to maintain the gas treatment amount constant and the amount of air is increased in response to increase in the methane concentration.

As will be explained later with reference to FIG. 8 and FIG. 10, in the case of the present arrangement of providing a heat exchanger for recovering heat generated from the oxidization removal and guiding this heat to the oxidization catalyst, if the total amount of treatment-object gas is treated as it is by the oxidization catalyst with keeping the gas treatment amount constant, the temperature of the oxidization catalyst outlet rises in association with increase in the methane concentration of the treatment-object gas. And, if the temperature of the oxidization catalyst inlet drops rises beyond the permissible upper limit temperature, the oxidization catalyst will deteriorate and its service life will be shortened. On the other hand, in case in addition to the treatment-object gas, an amount of air is fed separately to the oxidization catalyst so as to maintain the gas treatment amount constant and the amount of air is increased in response to increase in the methane concentration, such rise of the temperature of the oxidization catalyst outlet can be avoided, and there arises no need to provide the heat exchanger with any special treatment against high temperature and a favorable operation can continue for an extended period of time.

Preferably, the above operation is effected under the condition of the temperature of the oxidization catalyst inlet being 350° C. or higher and the temperature of the oxidization catalyst outlet being 550° C. or lower.

With use of the above temperature condition, favorable oxidization removal performance for methane can be maintained even in the presence of sulfur compound, and deterioration of the oxidization catalyst can be prevented.

Here, 350° C. is one example of the permissible lower limit temperature described above and 550° C. is one example of the permissible upper limit temperature described above.

Preferably, the treatment-object gas containing a low concentration of methane described above comprises a gas discharged from ventilation of a coal mine.

If the coal mine ventilation gas which would conventionally be discharged into the atmosphere is treated by the inventive method of removing low concentration of methane, it is possible to provide a technique that can contribute to prevention of global warming.

The low concentration methane removing method relating to the present invention can be implemented by a low concentration methane removing apparatus having the following construction and the same advantageous functions/effects as those described above can be achieved.

That is, an apparatus for removing low concentration methane from a treatment-object gas which contains the methane at such a low concentration as not to be rendered into a combustible range with whatever ratio of air mixed therewith, the apparatus comprising:

an oxidization catalyst for contact-oxidizing the methane;

a blower for introducing the treatment-object gas to the oxidization catalyst;

a heat exchanger for effecting heat exchange between gas prior to its passage through the oxidization catalyst and gas after its passage through the oxidization catalyst;

a detecting means disposed upstream of the oxidization catalyst and configured for detecting a methane concentration; and a controlling means configured to increase a rate of gas to be fed to the oxidization catalyst based on a detection result of the detecting means, if the methane concentration is low, by increasing a blowing rate of the blower.

With use of the above-described construction, it is possible to obtain a high methane removal performance and also to maintain the performance of the catalyst for a relatively long period of time.

Further, in connection with the temperature of the oxidization catalyst inlet, in case the low concentration methane removing apparatus above is to be provided with a capability of increasing the temperature range of the treatment object, preferably, in connection with a gas treatment amount as a flow rate of the gas to be treated by the oxidization catalyst, there is provided, as a first concentration, a methane concentration where the temperature of the oxidization catalyst inlet becomes a permissible lower limit temperature of the oxidization catalyst when the total amount of the treatment-object gas is treated by the oxidization catalyst with the gas treatment amount being kept constant: and when the methane concentration of the treatment-object gas is lower than said first concentration, with reduction in the gas amount by control of the blower by the controlling means, said rate of gas to be fed to the oxidization catalyst is restricted such that the gas treatment amount is decreased in response to reduction in the methane concentration.

With this, according to the technical principle described hereinbefore in connection with the low temperature methane removing method, it is possible to effectively cope with a treatment-object gas having a low concentration of methane while maintaining the temperature of the oxidization catalyst inlet temperature to the permissible lower limit temperature.

Further, in connection with the temperature of the oxidization catalyst outlet, in case the low concentration methane removing apparatus above is to be provided with a capability of increasing the temperature range of the treatment object, preferably, in connection with a gas treatment amount as a flow rate of the gas to be treated by the oxidization catalyst, there is provided, as a second concentration, a methane concentration where the temperature of the oxidization catalyst inlet becomes a permissible upper limit temperature of the oxidization catalyst when the total amount of the treatment-object gas is treated by the oxidization catalyst with the gas treatment amount being kept constant: and when the methane concentration of the treatment-object gas is higher than said second concentration, with increase in the gas amount by control of the blower by the controlling means, in addition to the treatment-object gas, an amount of air is fed separately to the oxidization catalyst so as to maintain the gas treatment amount constant and the amount of air is increased in response to increase in the methane concentration.

With this, according to the technical principle described hereinbefore in connection with the low temperature methane removing method, it is possible to effectively cope with a treatment-object gas having a low concentration of methane while maintaining the temperature of the oxidization catalyst outlet temperature to the permissible upper limit temperature.

Further, in constructing the low concentration methane removing apparatus of the present invention, preferably, the heat exchanger is disposed upstream of the oxidization catalyst and the blower is disposed upstream of the heat exchanger;

there is provided a suction pipe for drawing in the treatment-object gas; and between an outlet of the suction pipe and an inlet of the blower, there is provided a ventilation portion which allows communication of gas with the outside.

In the above construction, with the most simple arrangement of disposing a heat exchanger, a blower, a ventilation portion and a suction pipe, in this order on the upstream side of the oxidization catalyst, the amount of gas to be fed to the oxidization catalyst can be set in accordance with the blowing rate of the blower and the gas treatment amount which is the amount of the treatment-object gas to be treated by the oxidization catalyst can be set appropriately to suit the object of the present invention.

[Construction]

According to the characterizing feature of a method of removing low concentration methane from a treatment-object gas which contains the methane at such a low concentration as not to be rendered into a combustible range with whatever ratio of air mixed therewith, the method comprising the steps of:

feeding the treatment-object gas through a low temperature passageway (a passageway which receives low temperature heat medium and receives heat therefrom) of a heat exchanger for preheating the treatment-object gas;

feeding the resultant gas through an oxidation catalyst contact-oxidizing methane for a catalytic oxidation reaction;

feeding the resultant reacted gas again through a high temperature passageway (a passageway which receives high temperature heat medium and receives heat therefrom) of said heat exchanger together with an amount of un-reacted gas for recovery of heat from the reacted gas through heat exchange with the un-reacted gas; and feeding the resultant gas to a discharging passageway;

wherein a portion of the treatment-object gas to be fed to at least one of the low temperature passageway and the high temperature passageway communicated to the heat exchanger is caused to be fed through a shortcut passageway provided to shortcut the upstream side and the downstream side of said passageway relative to the heat exchanger; whereas the remaining portion of the treatment-object gas is caused to be fed through a passageway communicated to the heat exchanger;

the ratio of the treatment-object gas to be fed through the shortcut passageway relative to the total amount of the treatment-object passageway to be fed through a passageway communicated to the heat exchanger is set to vary such that the lower the ratio, the lower the concentration of methane in the treatment-object gas, and the higher the ratio, the higher the concentration of methane in the treatment-object gas.

[Function/Effect]

With the above characterizing feature of the present invention, in adopting the arrangement of providing a heat exchanger for recovering heat generated from methane removal to a gas to be fed to an oxidation catalyst, by varying the ratio of the flow rate to be fed to a shortcut passageway which shortcuts the heat exchanger, the temperature of the oxidization catalyst can be maintained appropriately. That is, for instance, when the methane concentration is low, the flow rate ratio to be fed to the shortcut passageway that shortcuts the heat exchanger is reduced. Conversely, when the methane concentration is high, the flow rate ratio to be fed to the shortcut passageway that shortcuts the heat exchanger is increased. With this, it is possible to restrict variation of the temperature at the oxidization catalyst inlet.

Whereby, a high methane removal performance can be obtained and also the performance of the catalyst can be maintained for an extended period of time. Here, when the temperature of the oxidization catalyst inlet or the oxidization catalyst outlet is referred to, this represents also the temperature of the gas at such portions.

[Construction]

Preferably, the oxidization catalyst for use in the above described low temperature methane removing method comprises iridium and platinum supported on a support comprised of zirconia, titania or a mixture thereof.

[Function/Effect]

These catalysts are capable of oxidizing methane even at a temperature ranging from 350° C. to 400° C. approximately and as the reduction of its activity due to sulfur compound is low, there arises no need to enlarge the capacity of the heat exchanger, thus being advantageous economically.

As will be explained later with reference to FIG. 15 and FIG. 17, in the case of the present arrangement of providing a heat exchanger for recovering heat generated from the oxidization removal and guiding this heat to the oxidization catalyst, if the total amount of treatment-object gas is treated as it is by the oxidization catalyst with keeping the gas treatment amount constant, the temperature of the oxidization catalyst outlet rises in association with increase in the methane concentration of the treatment-object gas. And, if the temperature of the oxidization catalyst inlet rises beyond the permissible upper limit temperature, the oxidization catalyst will deteriorate and its service life will be shortened. On the other hand, in accordance with the present arrangement, if a portion of the treatment-object is guided to the shortcut passageway that shortcuts the heat exchanger and the flow rate through the shortcut passageway is increased in response to increase in the methane concentration, such rise of the temperature of the oxidization catalyst outlet can be avoided, so that the service life of the oxidization catalyst can be long and there arises no need to provide the heat exchanger with any special treatment against high temperature, so that a favorable operation can continue for an extended period of time.

Incidentally, the shortcut passageway that shortcuts the heat exchanger will achieve similar effects whether it is disposed on the low temperature side of the heat exchanger (before the catalyst) or the high temperature side of the same (after the catalyst). However, disposing it on the low temperature side is advantageous in that the flow control valve requires no heat resistance.

[Construction]

Preferably, the above operation is effected under the condition of the temperature of the oxidization catalyst inlet being 350° C. or higher and the temperature of the oxidization catalyst outlet being 550° C. or lower.

[Function/Effect]

With use of the above temperature condition, favorable oxidization removal performance for methane can be maintained even in the presence of sulfur compound, and deterioration of the oxidization catalyst can be prevented.

Here, 350° C. is one example of the permissible lower limit temperature described above and 550° C. is one example of the permissible upper limit temperature described above.

[Construction]

Preferably, the treatment-object gas containing a low concentration of methane described above comprises a gas discharged from ventilation of a coal mine.

[Function/Effect]

If the coal mine ventilation gas which would conventionally be discharged into the atmosphere is treated by the inventive method of removing low concentration of methane, it is possible to provide a technique that can contribute to prevention of global warming.

[Construction]

The low concentration methane removing method relating to the present invention can be implemented by a low concentration methane removing apparatus having the following construction.

That is, an apparatus for removing low concentration methane from a treatment-object gas which contains the methane at such a low concentration as not to be rendered into a combustible range with whatever ratio of air mixed therewith, the apparatus comprising:

an oxidization catalyst for contact-oxidizing the methane;

a blower for introducing the treatment-object gas to the oxidization catalyst;

a heat exchanger for effecting heat exchange between a low temperature passageway (a passageway which receives low temperature heat medium and receives heat therefrom) and a high temperature passageway (a passageway which receives high temperature heat medium and receives heat therefrom) communicated to the heat exchanger upstream and downstream thereof;

a shortcut passageway provided to shortcut the upstream side and the downstream side of said passageway relative to at least one of the low temperature passageway and the high temperature passageway;

a flow control valve incorporated within a passageway communicated to the heat exchanger for feeding a portion of the treatment-object gas through the shortcut passageway and the remaining portion of the treatment-object gas to the heat exchanger; and a controlling means for variably setting the ratio of the treatment-object gas to be fed through the shortcut passageway relative to the total amount of the treatment-object passageway to be fed through the passageway communicated to the heat exchanger such that the lower the ratio, the lower the concentration of methane in the treatment-object gas, and the higher the ratio, the higher the concentration of methane in the treatment-object gas.

[Function/Effect]

With use of the above-described construction, it is possible to obtain a high methane removal performance and also to maintain the performance of the catalyst for a relatively long period of time, thus achieving similar functions/effects described hereinbefore.

Effects of the Invention

With the methane removing method of the present invention, it is possible to employ a catalyst having a very good resistance against activity inhibition due to sulfur compounds. Therefore, even in the presence of various sulfur compounds. (hydrosulfide, methyl mercaptan, dimethyl sulfide, sulfur oxide, etc.), the methane removal is possible from such low temperature as about 350° C. Accordingly, in comparison with the conventional technique, it is possible to reduce the capacity of the heat exchanger, so that the economic performance can be improved significantly. Further, with the methane removing method of the present invention, it is possible to keep the catalyst outlet temperature 550° C. or lower constantly even in the event of sudden sharp variation in the methane concentration in the treatment-object gas. Therefore, the durability of the catalyst can be ensured and stable methane removal performance can be obtained for an extended period of time. In addition, as there arises no need of using expensive materials for the pining, the heat exchanger, the economic performance can be improved significantly.

BRIEF DESCRIPTION OF THE DRAWINGS

FIG. 1 is a view showing a construction of a methane removing apparatus according to the present invention, FIG. 2 is an explanatory view illustrating a representative example of operation conditions on the low concentration side and the high concentration side.

MODES OF EMBODYING THE INVENTION

Figure 3:
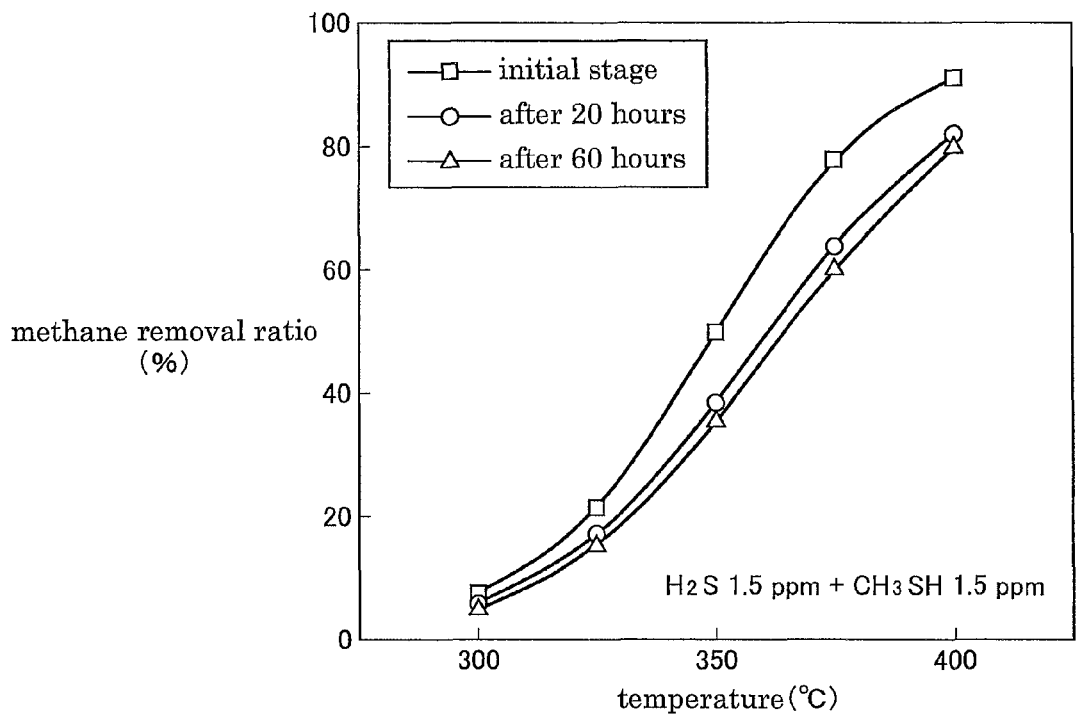
FIG. 3 is a view showing methane removing performance and time changes in the performance of a Ir—Pt/zirconia catalyst in the co-presence of sulfur compounds ($CH_3SH$ 1.5 ppm+$H_2S$ 1.5 ppm)

Next, with reference to the accompanying drawings, there will be explained a low concentration methane removing apparatus according to the present invention.

First Embodiment

A low concentration methane removing apparatus 100 according to the present invention includes a blower 1 for introducing a treatment-object gas G to the apparatus 100, an oxidization catalyst 2 for contact-oxidizing methane (FIG. 1 shows a condition where the oxidization catalyst is accommodated within a treatment cylinder), a heat exchanger 3 for effecting heat exchange between gases Gin, Gout before and after passage through the oxidization catalyst 2, a methane concentration detecting means 4 disposed upstream of the oxidization catalyst 2, and a controlling means 5 for controlling a blowing rate of the blower 1 in accordance with a detection value of the detecting means 4. Upstream of a suction inlet 1a of this blower 1, there is provided a suction pipe 6 for drawing in an amount of treatment-object gas G from a suctioning portion; and between an outlet of this suction pipe 6 and the suction inlet 1a of the blower 1, there is provided a ventilation portion 7 providing a certain level of resistance.

Therefore, with this arrangement, to the oxidization catalyst 2, a portion or all of the treatment-object gas G is fed. The range of blowing rate of the blower 1 extends across the maximum suction rate that the suction 6 can provide. Hence, as the blowing rate of the blower 1 is small in the blowing rate range on the low flow rate side of the blower 1, there occurs a condition in which a portion of the treatment-object gas G is discharged to the outside through the ventilation portion 7 (see FIG. 2 (a)). Whereas, in the blowing rate range on the high flow rate side of the blower 1, there occurs a condition in which the maximum flow amount of the treatment-object gas G is suctioned and also an amount of air A is suctioned from the ventilation portion 7 (see FIG. 2 (b)). Here, on the low flow rate side, the flow rate will vary such that in association with increase of the blowing rate, the suction amount of the treatment-object gas G will increase to the maximum flow rate, then, continue as it is, i.e. the maximum flow rate (FIG. 2 (a) shows a condition in which the flow rate of the treatment-object gas is small in FIG. 9 to be described later). On the other hand, on the high flow rate side described above, in association with increase in the blowing rate, the suction rate of the treatment-object gas G will increase to the maximum flow rate while the air amount will increase gradually at the same time (FIG. 2 (b) shows a condition in which an amount of air is being suctioned in FIG. 10 to be described later).

As described hereinbefore, the controlling means 5 controls the blowing rate of the blower 1 in accordance with a methane concentration detection value of the detecting means 4. In this regard, according to the control mode of the blower 1 by the controlling means 5 relating to the present invention, in accordance with the methane concentration of the treatment-object gas, when the methane concentration is low, the amount of gas to be fed to the oxidization catalyst 2 is decreased, whereas, when the methane concentration is high, the amount of gas to be fed to the oxidization catalyst 2 is increased.

Further, by adopting the above-described configuration unique to the present invention on the upstream side of the blower 1 described above, in accordance with controlling of the blowing rate, the operation mode of the low concentration side and the operation mode of the high concentration side will vary.

Operation Mode of Low Concentration Side

In the operation mode of this concentration range, as to the gas treatment amount as the flow rate of the treatment-object gas G to be treated by the oxidization catalyst 2;

Assume a first concentration D1 is a methane concentration where the temperature of an oxidization catalyst inlet 2 in becomes the permissible lower limit temperature of the oxidization catalyst 2 if the total amount of the treatment-object gas G is treated as it is by the oxidization catalyst 2. Then, if the methane concentration of the treatment-object gas G is lower than this first concentration D1, the gas amount to be fed to the oxidization catalyst 2 is restricted such that the gas treatment amount is decreased in association with reduction in the methane concentration. This first concentration D1 will be explained in greater details later with reference to FIG. 9.

Operation Mode of High Concentration Side

In the operation mode of this concentration range, as to the gas treatment amount as the flow rate of the treatment-object gas G to be treated by the oxidization catalyst 2;

Assume a second concentration D2 is a methane concentration where the temperature of an oxidization catalyst outlet 2 out becomes the permissible upper limit temperature of the oxidization catalyst 2 if the total amount of the treatment-object gas G is treated as it is by the oxidization catalyst 2. Then, if the methane concentration of the treatment-object gas G is higher than this second concentration D2, by separating feeding an amount of air A to the oxidization catalyst in addition to the treatment-object gas G, the gas treatment amount is maintained to a fixed amount and the amount of air A is increased in association with increase in the methane concentration. This second concentration D2 will be explained in greater details later with reference to FIG. 10.

[Oxidization Catalyst]

The oxidization catalyst 2 comprises preferably a catalyst including iridium and platinum supported on a support made of zirconia or titania or a mixture thereof. These catalysts are capable of oxidization removal of methane even at a low temperature of about 350° C. and also suffer only small activity reduction even in the co-existence of sulfur compounds such as hydrogen sulfide, sulfur dioxide.

Oxidization Catalyst (a)

FIG. 3 shows temperature dependency in case a gas ($CH_4$ 1000 ppm, $O_2$ 20%, $H_2O$ 3%, the rest $N_2$) simulating a coal mine ventilation gas is fed through a catalyst (particle diameter: about 1 mm, 1.45 g) supporting Ir 3 wt % and Pt 2 wt % on a zirconia support (BET specific surface area: 17 $m^2$/g) at a flow rate of 120 l/h (corresponding to gas volumetric hourly space velocity GHSV: 80,000 $h^{-1}$). With the initial activity, 50% methane removal ratio was obtained at 350° C., showing that the reaction can be initiated sufficiently with the catalyst inlet temperature of about 350° C.

Figure 4:
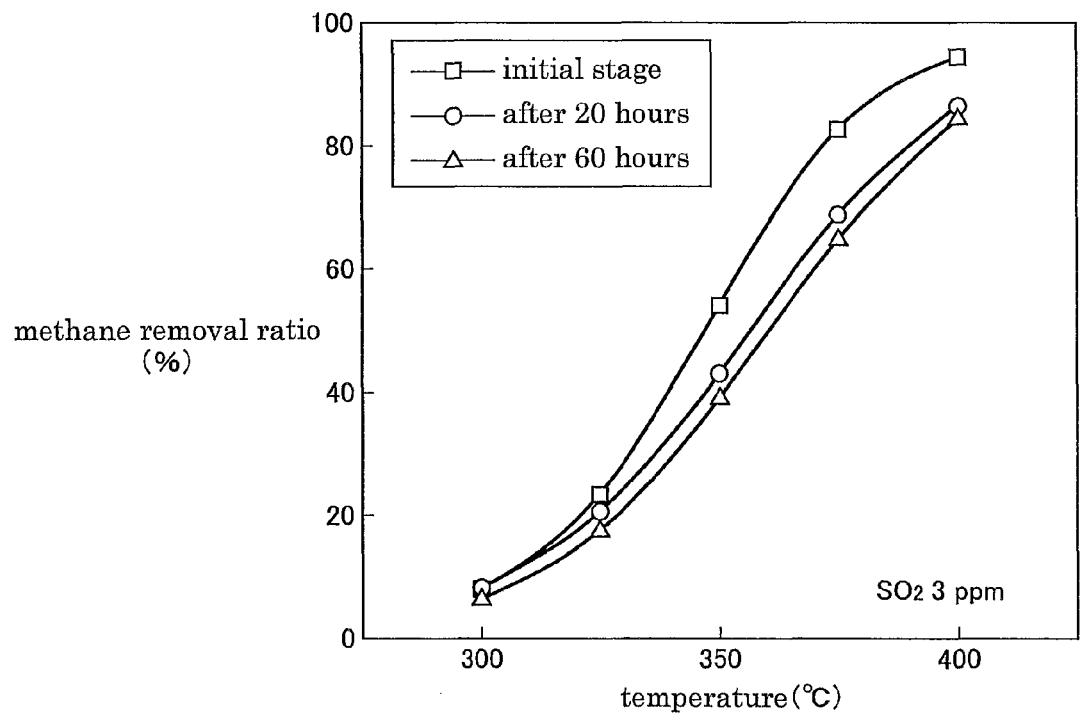
FIG. 4 is a view showing methane removing performance and time changes in the performance of the Ir—Pt/zirconia catalyst in the co-presence of sulfur compound ($SO_2$ 3 ppm)

Subsequently, with addition of sulfur compounds ($CH_3SH$ 1.5 ppm+$H_2S$ 1.5 ppm), the reaction was continued at 400° C. And, after lapses of 20 hours and 60 hours, methane removal ratios were determined respectively. The results show that although the activity was reduced slightly, 38% methane removal ratio (after 20 hours) and 35% methane removal ratio (after 60 hours) were obtained at 350° C., thus showing the reduction in the activity being small in spite of the coexistence of sulfur compounds. Even when the sulfur compound was changed to $SO_2$ 3 ppm, the result was substantially the same (FIG. 4). Hence, it was confirmed that regardless of the type of the sulfur compound, the catalyst supporting Ir and Pt on the zirconia support exhibits high methane removal performance.

Oxidization Catalyst (b)

Figure 5:
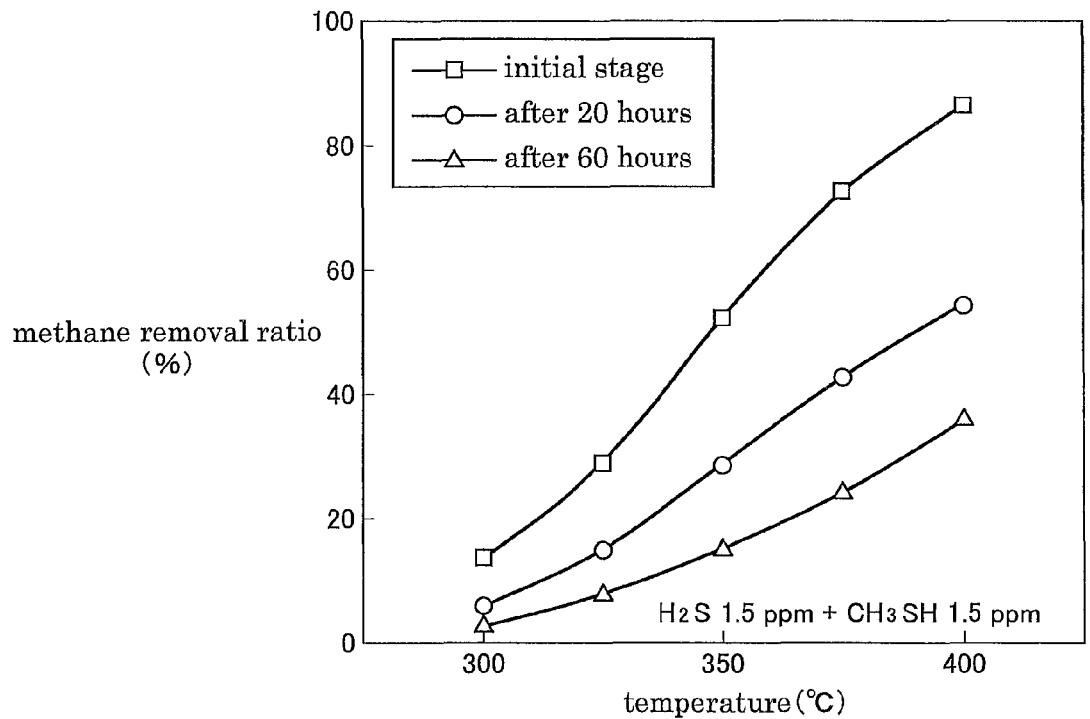
FIG. 5 is a view showing methane removing performance and time changes in the performance of a Pd—Pt/alumina catalyst in the co-presence of sulfur compounds ($CH_3SH$ 1.5 ppm+$H_2S$ 1.5 ppm)
Figure 6:
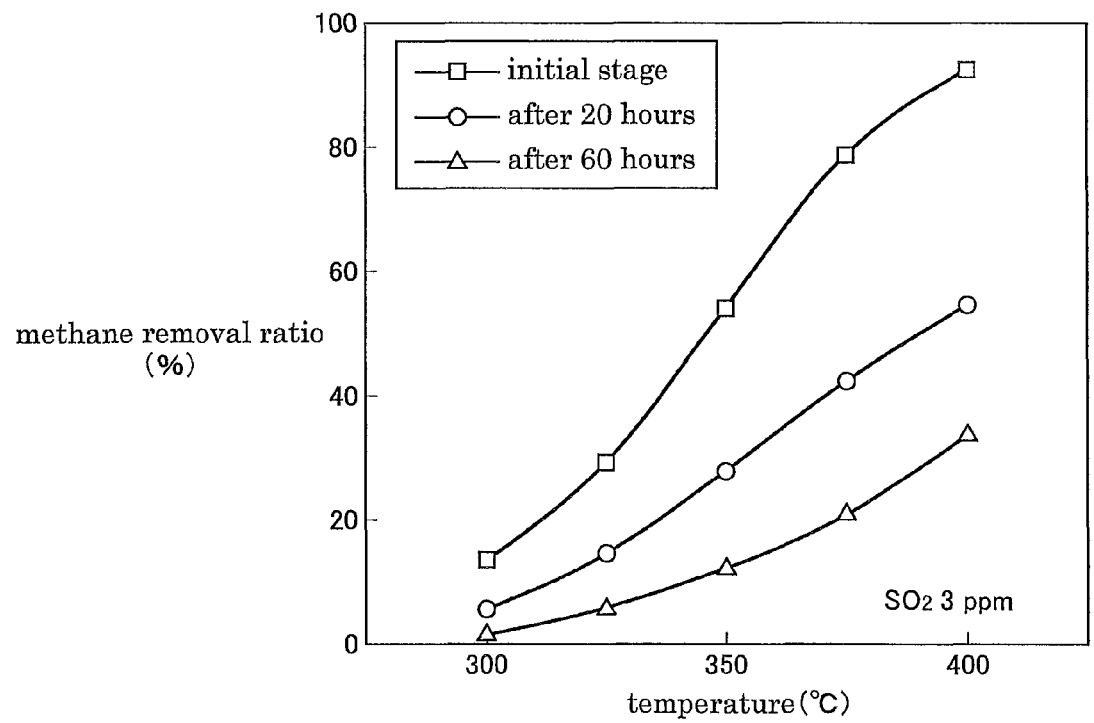
FIG. 6 is a view showing methane removing performance and time changes in the performance of the Pd—Pt/alumina catalyst in the co-presence of sulfur compound ($SO_2$ 3 ppm)

FIGS. 5 and 6 show results of similar evaluations of methane removal performance on a catalyst (particle diameter: about 1 mm, 1.45 g) supporting Pd 3 wt % and Pt 2 wt % on an alumina support (γ type: BET specific surface area: 125 $m^2/g$) (corresponding to GHSV: 63,000 $h^{-1}$). Conventionally, a catalyst supporting Pd and/or Pt on an alumina support for use in VOC oxidization is equivalent in its activity to the catalyst supporting Ir and Pt on a zirconia support, hence, can be used in the low concentration methane removing apparatus of the invention. However, this catalyst suffers a shortcoming of losing its methane removal ability in a short period of time in the coexistence of a sulfur compound.

Oxidization Catalyst (c)

Figure 7:
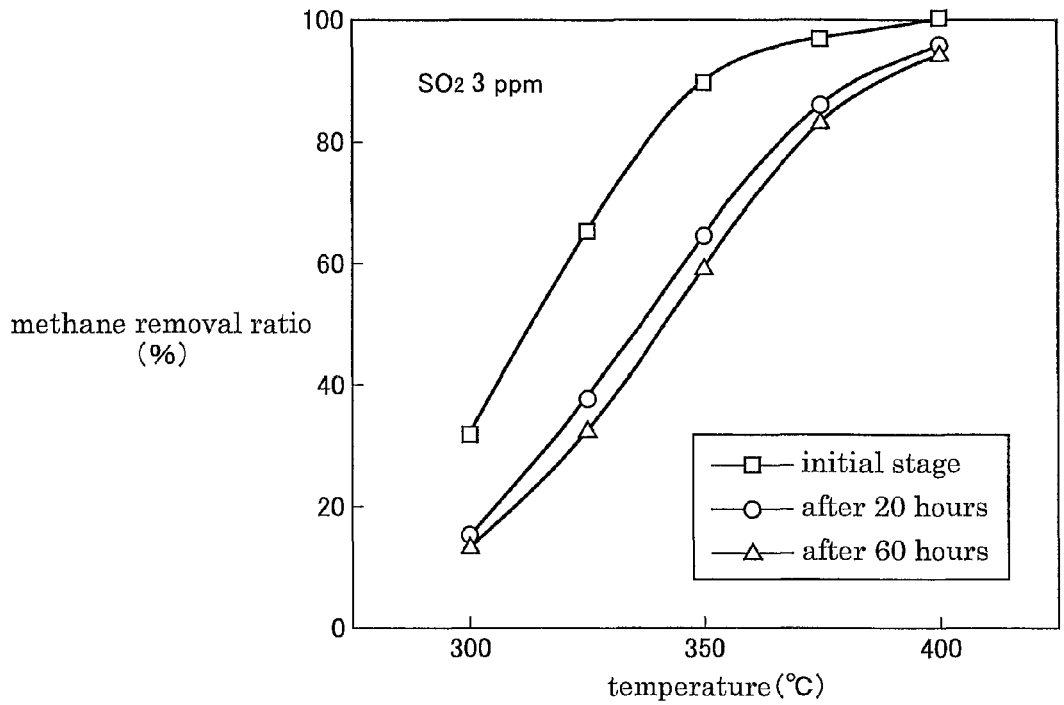
FIG. 7 is a view showing methane removing performance and time changes in the performance of a Ir—Pt/titania catalyst in the co-presence of sulfur compound ($SO_2$ 3 ppm)

FIG. 7 shows results of similar evaluation of methane removal performance on a catalyst (particle diameter: about 1 mm, 1.45 g) supporting Ir 3 wt % and Pt 2 wt % on a titania support (corresponding to GHSV: 50,000 $h^{-1}$). With the initial activity, 90% methane removal ratio was obtained at 350° C. And, even after lapse of 60 hours, 59% methane removal performance was obtained in the coexistence of $SO_2$.

In the above-described experiments, the reactions were continued for 60 hours at 400° C. But, catalyst activities after the reaction were effected at higher temperatures (500° C., 550° C.) were also studied. As shown in Table 1 below, in the cases of the catalysts ((a), (c)) supporting iridium and platinum on the zirconia or titania support, the activities thereof were hardly reduced as long as the temperature was not higher than 500° C. Rather, the activities were enhanced. On the other hand, the activities were reduced when the temperature became 550° C. In the case of the catalyst conventionally employed in VOC treatment, it was believed that Pt/alumina can be used up to about 600° C. and Pd/alumina can be used up to about 700° C. It is understood, however, that in the case of the catalysts supporting iridium and platinum on the zirconia or titania support can be used for methane oxidization at lower temperatures than the conventional catalyst, but these suffer also reduction in the endurable temperature limits of the catalysts.

TABLE 1

| supported metal | support | endurable treatment temperature (° C.) | methane removal ratio after 60 hrs. endurance treatment (%) | |
| --- | --- | --- | --- | --- |
| | | | 350° C. | 400° C. |
| 3% Ir—2% Pt | $ZrO_2$ | 400 | 39 | 84 |
| | | 500 | 37 | 83 |
| | | 550 | 29 | 72 |
| 3% Ir—2% Pt | $TiO_2$ | 400 | 59 | 94 |
| | | 500 | 68 | 96 |
| | | 550 | 59 | 87 |

Although the shape of the oxidization catalyst 2 does not matter, preferably, the oxidization catalyst 2 has a honeycomb shape having less pressure loss, from the viewpoint of maximally reducing the power of the blower 1. And, a cordierite or metal honeycomb with wash-coating is particularly preferred as it has superior strength and heat resistance also.

As to the use amount of the oxidization catalyst 2, if it is too small, no effective methane removal performance can be obtained. But, if it is too large, it is economically disadvantageous. Therefore, preferably, the use amount ranges from 1,000 to 200,000 $h^{-1}$ in the gas hourly space velocity (GHVS), more preferably ranges from 20,000 to 100,000 $h^{-1}$ approximately.

[Heat Exchanger]

The type of the heat exchanger 3 for use in the present invention can be any type, as long as it allows gas-gas heat exchange and does not suffer much pressure loss. Normally, however, the plate-and-fin type heat exchanger known as a compact heat exchanger, is preferred. The heat transfer area of the heat exchanger used can be chosen as desired. It is preferred however that the heat exchanger have an NTU ranging from 2.5 to 5 relative to the exhaust amount of the coal mine ventilation gas.

[Detecting Means]

The type of the methane concentration detecting means 4 for use in the present invention does not matter, as long as it has sufficient response and stability. For instance, however, nondispersive infrared methane concentration meter or a semiconductor gas sensor using tin oxide can be used.

The foregoing is an explanation of the low concentration methane removing apparatus 100. Next, an inventive method for removing low concentration methane will be explained.

According to the characterizing features of the low concentration methane removing method of the present invention, the methane-containing, treatment-object gas G is caused to be fed through the heat exchanger 3 to be preheated (this treatment-object gas is Gin). Then, the resultant gas is caused to be fed through the oxidization catalyst 2 for effecting contact-oxidization of methane (this treatment-object gas is Gout). Then, the resultant gas is caused to be fed through the heat exchanger 3 again so that heat is recovered therefrom through heat exchange with an un-reacted treatment-object as Gin. Further, the amount of gas to be fed to the oxidization catalyst 2 by the blower 1 is caused to vary in accordance with the concentration of the treatment-object gas. As shown in FIG. 2, assume Q1 represents the amount of treatment-object gas to be suctioned with an operation of the blower 1; Q2 represents the amount of discharged treatment-object gas; Q3 represents the amount of suctioned air; then, the gas amount to be fed to the oxidization catalyst 2 will be Q1-Q2 in the case of the condition shown in FIG. 2 (a) corresponding to FIG. 9 and will be Q1+Q3 in the case of the condition shown in FIG. 2 (b) corresponding to FIG. 10.

As one example, a treatment of a coal mine ventilation gas 8 (exhaust amount: 100 $m^3/s$. 25° C.) whose methane concentration varies between 0.25 and 1.0% will be contemplated. In the case of this example, it is assumed that the amount of treatment-object gas is maintained constant (100 $m^3/s$).

Figure 8:
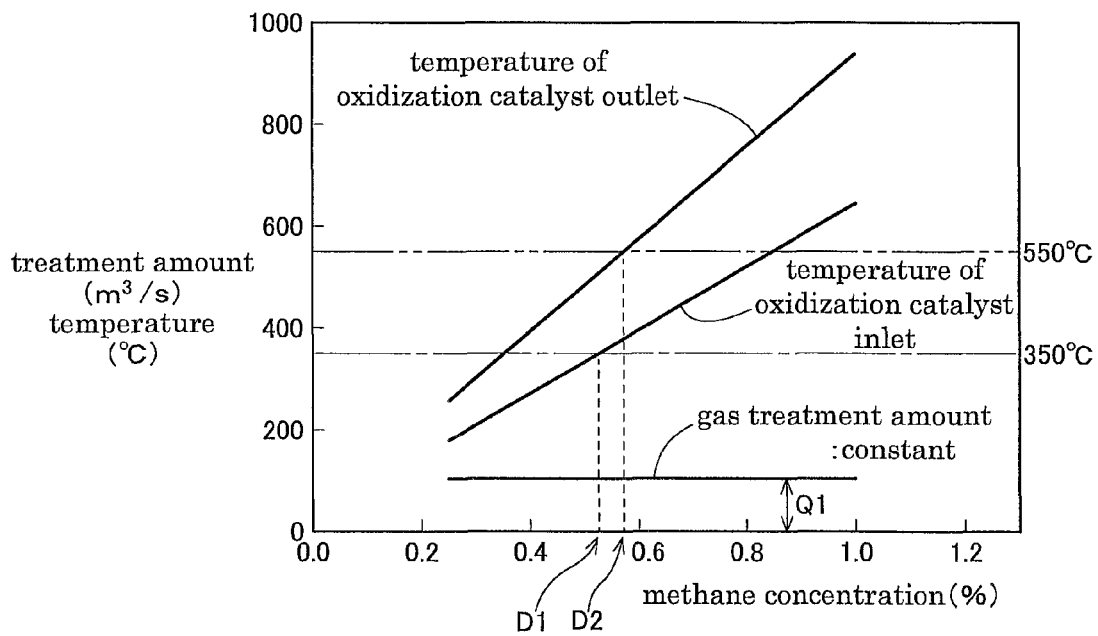
FIG. 8 is a view showing relationship between catalyst inlet and outlet temperatures and methane concentrations when methane removal is carried out with keeping the blowing rate of the blower constant irrespectively of methane concentrations, not according to the present invention.

Assume the heat exchanger has an NTU value of 3 and 25 kW discharged heat loss occurs in the oxidization catalyst and the connector pipe. Then, in case the total amount of the coal mine ventilation gas is treated as it is irrespectively of the methane concentration, the gas temperatures at the catalyst inlet 2 in and the catalyst outlet tout vary relative to the methane concentration as shown in FIG. 8. Actually, when the oxidization catalyst inlet temperature drops below 350° C. (denoted by the one-dot chain line in FIGS. 8, 9 and 10), the methane removal performance of the oxidization catalyst is reduced. On the other hand, when the temperature at the oxidization catalyst outlet rises beyond 550° C. (denoted with the two dot chain line in FIGS. 8, 9 and 10), a non-restorable reaction will occur in the catalyst. Therefore, the possibility of actually stable methane removal is limited to the very narrow range from 0.53 to 0.58%. The first concentration D1 described hereinbefore is 0.53% and the second concentration D2 also described hereinbefore is 0.58%, respectively in this example.

Figure 9:
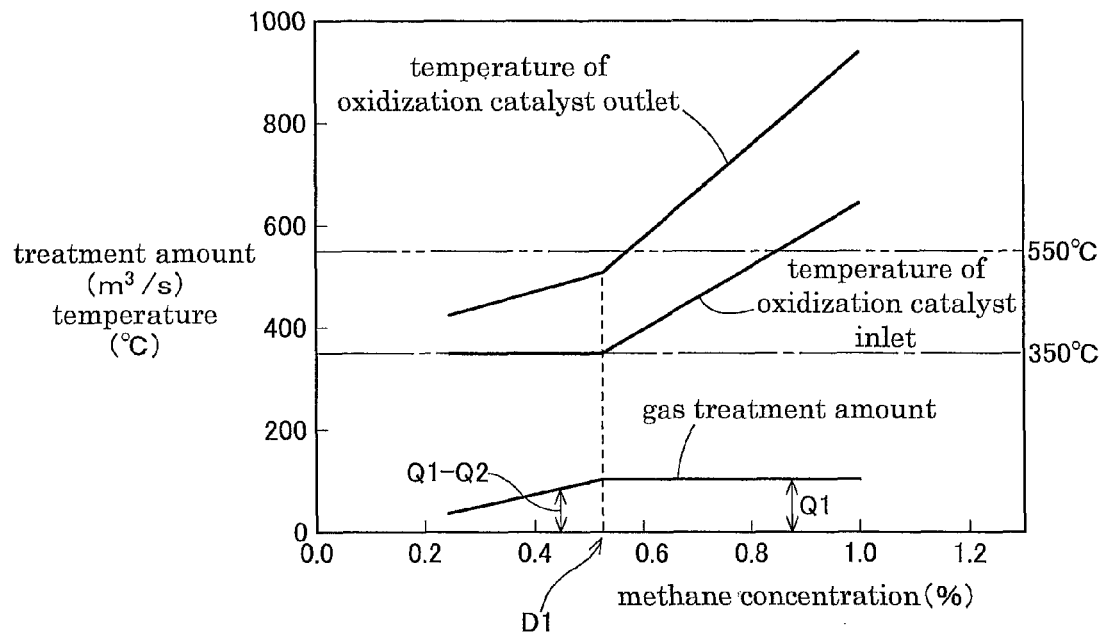
FIG. 9 is a view showing relationship between catalyst inlet and outlet temperatures and methane concentrations when a control is executed such that the blowing rate of the blower is reduced in case the methane concentration drops below a first concentration D1.

On the other hand, in the case of the arrangement of reducing the gas treatment amount (feeding only a portion of the treatment-object gas to the oxidization catalyst in this case) when the methane concentration drops below the above-described first concentration D1, although the treatable gas mount decreases to 30 m$^3$/s for methane concentration of 0.25%, the temperature of the oxidization catalyst can be maintained at 350° C. Hence, methane treatment is partially possible even when the methane concentration is reduced and the it becomes possible to cope with the methane concentration ranging from 0.25% to 0.58% (FIG. 9). Putting this in other words, when the methane concentration is low, a part of the coal mine ventilation gas will be discharged, but since the concentration of methane contained therein is low originally, it may be said that its influence is limited.

Figure 10:
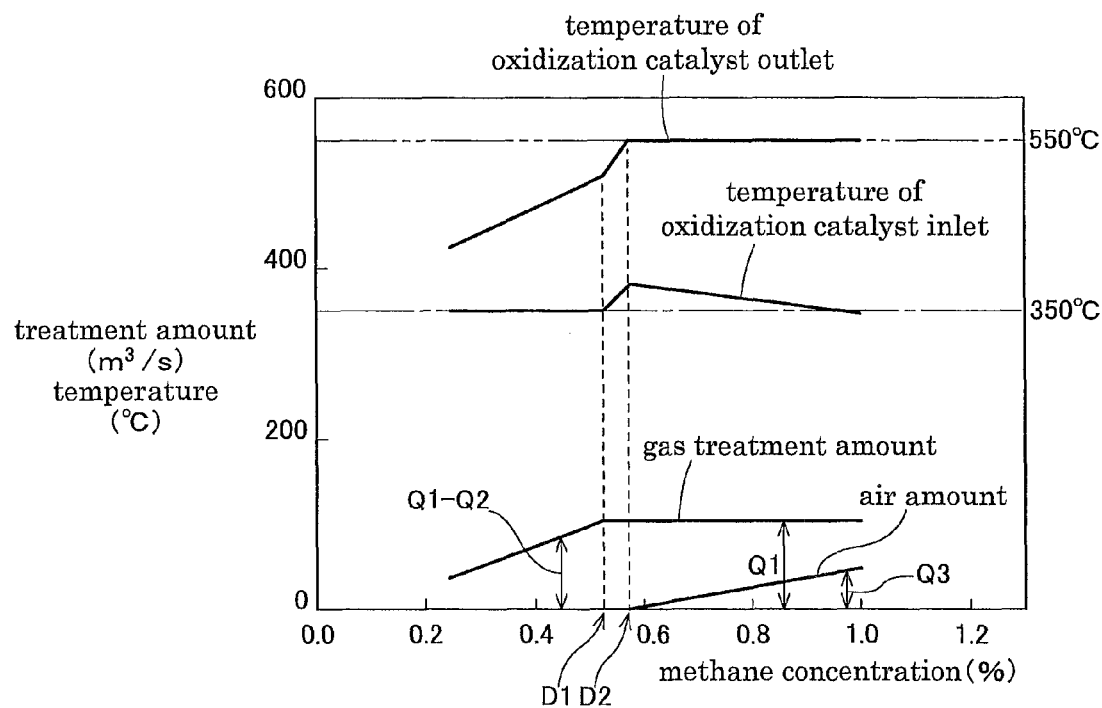
FIG. 10 is a view showing relationship between catalyst inlet and outlet temperatures and methane concentrations when a control is executed such that the blowing rate of the blower is reduced in case the methane concentration drops below the first concentration D1 and the blowing rate of the blower is increased in case the methane concentration rises beyond a second concentration D2.

Further, when the methane concentration becomes greater than the second concentration D2, if the blowing rate of gas by the blower is increased, an excess amount of air A will be suctioned, in addition to the coal mine ventilation gas (in this case, the gas treatment amount becomes maximum while the suction amount of air will increase). With this, there will occur an effect of decreasing the methane concentration of the gas present inside the apparatus. In this case, the upper limit of the methane concentrations with which the oxidization catalyst outlet temperature can be maintained at 550° C. or lower and the oxidization catalyst inlet temperature can be maintained at 350° C. or higher, will be extended to about 1% (FIG. 10).

Second Embodiment

Figure 11:
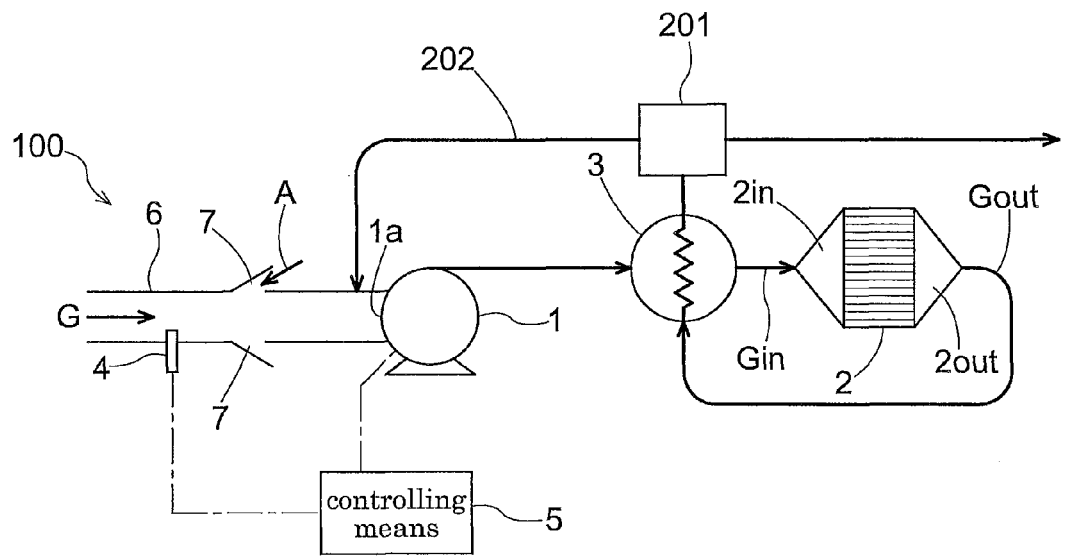
FIG. 11 is a views showing a second embodiment of the methane removing apparatus of the present invention providing a flow amount distributing means and a piping for refluxing a portion of a gas on the apparatus outlet side to the apparatus inlet side, FIG. 12 a view showing an example of a construction of the methane removing apparatus according to the present invention.

As shown in FIG. 11, the methane oxidization removing apparatus 100 of the invention can be provided, if needed, with a flow amount distributing means 201 and a pipe 202 for refluxing a portion of the exhaust gas from the apparatus outlet side to the apparatus inlet side.

With co-utilization of this method of refluxing a portion of the exhaust gas from the apparatus outlet side to the apparatus inlet side, even when the methane concentration is about 1.2%, it is still possible to maintain the catalyst outlet temperature at 550° C. or lower and the catalyst inlet temperature at 350° C. or higher.

Modified Embodiments of First and Second Embodiments (1) In the foregoing embodiments, the blower was provided at the inlet of the apparatus. However, it does not matter as long as this blower is capable of introducing the treatment-object gas to the oxidization catalyst. So, it is possible to configure such that the blower is disposed not at the inlet but at the outlet of the apparatus thereby to establish a negative pressure inside the apparatus relative to the atmospheric pressure.

(2) Preferably, the methane concentration detecting means should be disposed in close vicinity of the inlet of the apparatus from the viewpoint of detecting variation in the methane concentration as quickly as possible and this detecting means should be disposed within the suction pipe from the viewpoint of detecting the methane concentration of the treatment-object gas. However, in the construction of the present invention, as the treatment-object gas amount and the air amount are determined in accordance with the blowing rate of the blower, the methane concentration detecting means may be disposed at the outlet side of the heat exchanger. In this case of providing it at the outlet of the heat exchanger, the relationship between the treatment-object gas and the air amount determined by the blowing rate will be obtained in advance and a detection value will be converted into the concentration of methane in the treatment-object gas from this relationship, whereby the above-described control of the blowing rate according to the methane concentration can be realized. Or, the relationship between the methane concentration at the outlet side of the heat exchanger and the blowing rate may be obtained in advance.

(3) The low concentration methane removing apparatus according to the present invention may be provided, if necessary, with a determining means for determining gas temperatures at the oxidization catalyst inlet and the oxidization catalyst outlet. With this, it becomes possible to stop the apparatus in a safe manner even when an abnormality occurs in the methane concentration detecting means.

(4) In the foregoing embodiment, for the purpose of extending the range of removable methane concentrations, both the adjustment of the gas flow rate based on the first concentration D1 (reduction of the gas flow rate which can be considered equivalent to the gas flow rate on the low concentration side of the methane concentration) and the adjustment of the gas flow rate based on the second concentration D2 (increase of the air amount to be suctioned on the high concentration side of the methane concentration) were effected. Instead of this, either the former adjustment alone or the latter adjustment alone may be effected. Such arrangement is made possible because the variation condition of the treatment-object gas differs depending on the geographical region, etc.).

Third Embodiment

Figure 12:
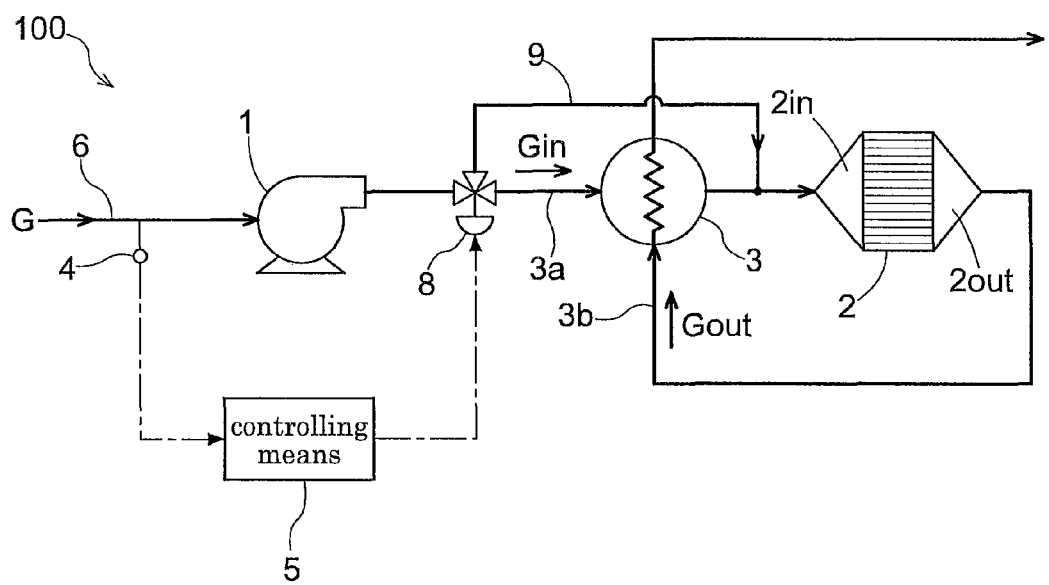

A low concentration methane removing apparatus 100 according to the present invention includes a blower 1 for introducing a treatment-object gas G to the apparatus 100, an oxidization catalyst 2 for contact-oxidizing methane (FIG. 12 shows a condition where the oxidization catalyst is accommodated within a treatment cylinder), a heat exchanger 3 for effecting heat exchange between gas Gin in a low temperature passageway 3a and gas Gout in a high temperature passageway 3b before and after passage through the oxidization catalyst 2 respectively, and a methane concentration detecting means 4 such as a gas sensor disposed upstream of the oxidization catalyst 2 for detecting the methane concentration. The apparatus 100 further includes a shortcut passageway 9 that shortcuts between the upstream side and the downstream side of the heat exchanger 3 in the low temperature passageway 3a, a flow control valve 8 for adjusting a flow rate ratio, and a controlling means 5 for controlling the ratio of the flow amount to be fed to the shortcut passageway 9 in accordance with a detection value of the detecting means 4.

As described hereinbefore, the controlling means 5 controls the blowing rate of the flow control valve 8 in accordance with a methane concentration detection value of the detecting means 4. In this regard, according to the control mode of the flow control valve 8 by the controlling means 5 relating to the present invention, in accordance with the methane concentration of the treatment-object gas, when the methane concentration is low, the amount of gas to be fed to the oxidization catalyst is decreased, whereas, when the methane concentration is high, the amount of gas to be fed to the oxidization catalyst is increased.

[Oxidization Catalyst]

As the oxidization catalyst 2, in addition to the oxidization catalysts (a) through (c) employed in the foregoing embodiment, a further catalyst (d) described below can be employed. This catalyst is capable of oxidizing methane even at a low temperature ranging from 350° C. to 400° C. approximately and also suffers only small activity reduction even in the co-existence of sulfur compounds such as hydrogen sulfide, sulfur dioxide.

Oxidization Catalyst (d)

Figure 14:
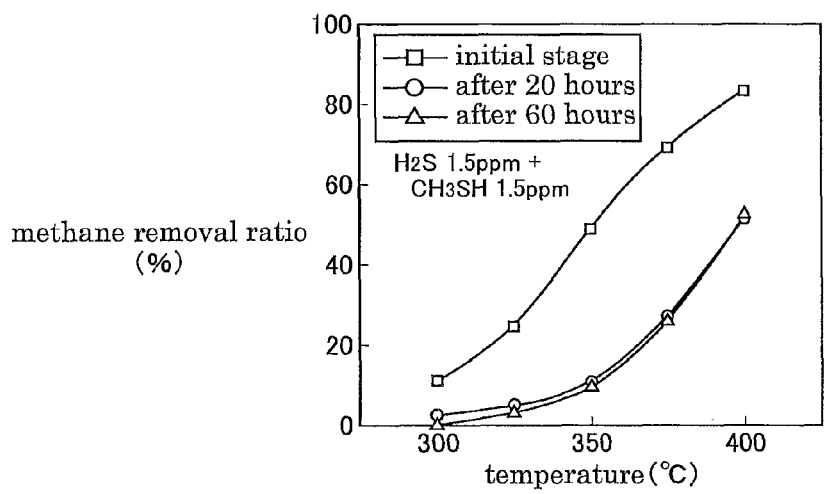
FIG. 14 is a view showing methane removing performance and time changes in the performance of a Pd—Pt/zirconia catalyst in the co-presence of sulfur compounds ($CH_3SH$ 1.5 ppm+$H_2S$ 1.5 ppm)

FIG. 14 shows result evaluation of methane removal performance on a catalyst (particle diameter: about 1 mm, 1.45 g) supporting Pd 3 wt % and Pt 2 wt % on a zirconia support (corresponding to GHSV: 80,000 $h^{-1}$). With the initial activity, 83% methane removal ratio was obtained at 400° C. And, even after lapse of 60 hours, 52% methane removal performance was obtained at 400° C. in the coexistence of sulfur compounds. If the catalyst inlet temperature is set to 400° C. or higher, this catalyst can function effectively even in the coexistence of sulfur compounds.

[Heat Exchanger]

The type of the heat exchanger 3 for use in the present invention can be any type, as long as it allows gas-gas heat exchange and does not suffer much pressure loss. Normally, however, the plate-and-fin type heat exchanger known as a compact heat exchanger, or a rotary thermal storage type heat exchanger is preferred. The heat transfer area of the heat exchanger used can be chosen as desired. It is preferred however that the heat exchanger 3 to be chosen have an NTU ranging from 5 to 15 relative to the exhaust amount of the coal mine ventilation gas.

[Detecting Means]

The type of the methane concentration detecting means 4 for use in the present invention does not matter, as long as it has sufficient response and stability. For instance, however, nondispersive infrared methane concentration meter or a semiconductor gas sensor using tin oxide can be used.

The foregoing is an explanation of the low concentration methane removing apparatus 100. Next, an inventive method for removing low concentration methane will be explained.

[Method of Removing Low Concentration Methane]

According to the characterizing features of the low concentration methane removing method of the present invention, the methane-containing, treatment-object gas G is caused to be fed through the heat exchanger 3 to be preheated. Then, the resultant gas is caused to be fed through the oxidization catalyst 2 and then, the resultant gas is caused to be fed through the heat exchanger 3 again so that heat is recovered therefrom through heat exchange with an un-reacted treatment-object. Further, a portion of the treatment-object gas is caused to be fed to a shortcut passageway 9 which is provided to shortcut the heat exchanger 3 and the flow rate ratio to be fed to the shortcut passageway 9 is varied in accordance with the methane concentration of the treatment-object gas.

As one example, a treatment of a coal mine ventilation gas (exhaust amount: 100 m³/s. 25° C.) whose methane concentration varies between 0.3 and 0.75% will be contemplated. In the case of this example, it is assumed that the amount of treatment-object gas is maintained constant (100 m³/s).

Figure 15:
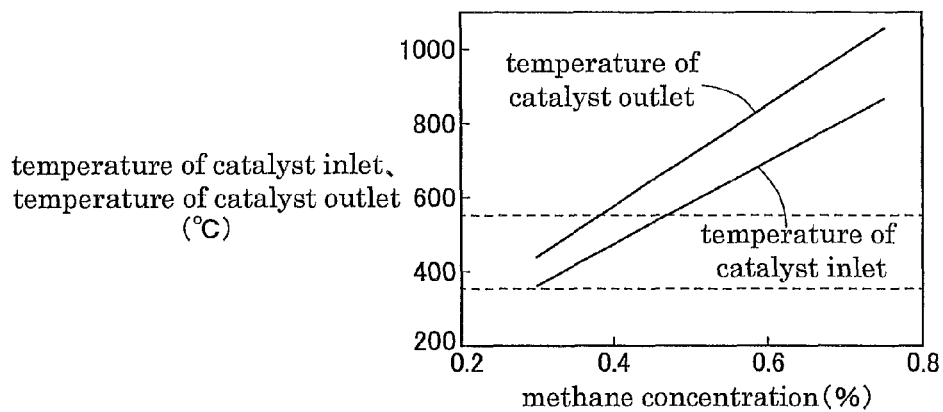
FIG. 15 is a view showing relationship between catalyst inlet and outlet temperatures and methane concentrations when methane removal is carried out with keeping the blowing rate of the blower constant irrespectively of methane concentrations, in case the total amount of the treatment-object gas is fed to the heat exchanger, not according to the method of the present invention.

Assume the heat exchanger 3 has an NTU value of 10 and 25 kW discharged heat loss occurs in the oxidization catalyst and the connector pipe. Then, in case the total amount of the coal mine ventilation gas is treated as it is through the heat exchanger 3 irrespectively of the methane concentration, the gas temperatures at the catalyst inlet 2 in and the catalyst outlet tout vary relative to the methane concentration as shown in FIG. 15. Actually, when the oxidization catalyst inlet temperature drops below 350° C. (denoted by the one-dot chain line in FIGS. 15 and 17), the methane removal performance of the oxidization catalyst is reduced. On the other hand, when the temperature at the oxidization catalyst outlet rises beyond 550° C. (denoted with the two dot chain line in FIGS. 15 and 17), a non-restorable reaction will occur in the catalyst. Therefore, the possibility of actually stable methane removal is limited to the very narrow range from 0.3 to 0.4%.

Figure 16:
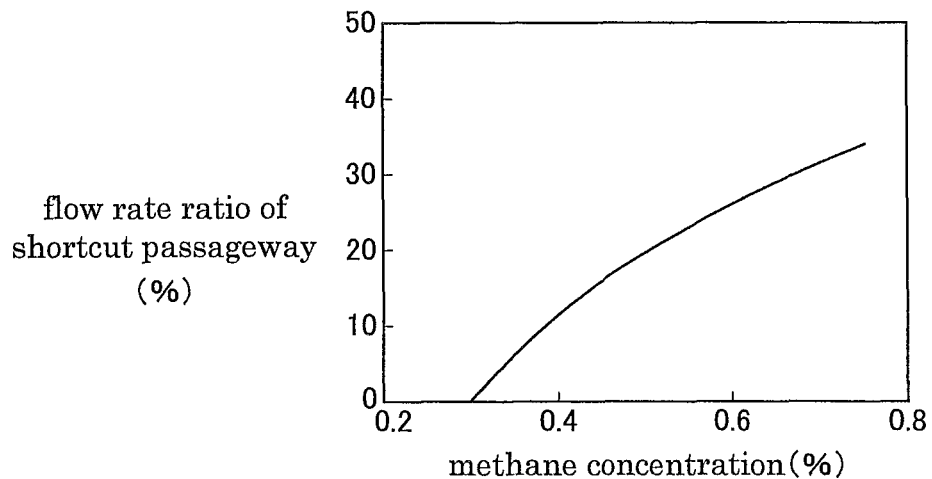
FIG. 16 is a view showing one example of relationship between methane concentrations and flow rate ratios to be fed to a shortcut passageway that shortcuts the heat exchanger.
Figure 17:
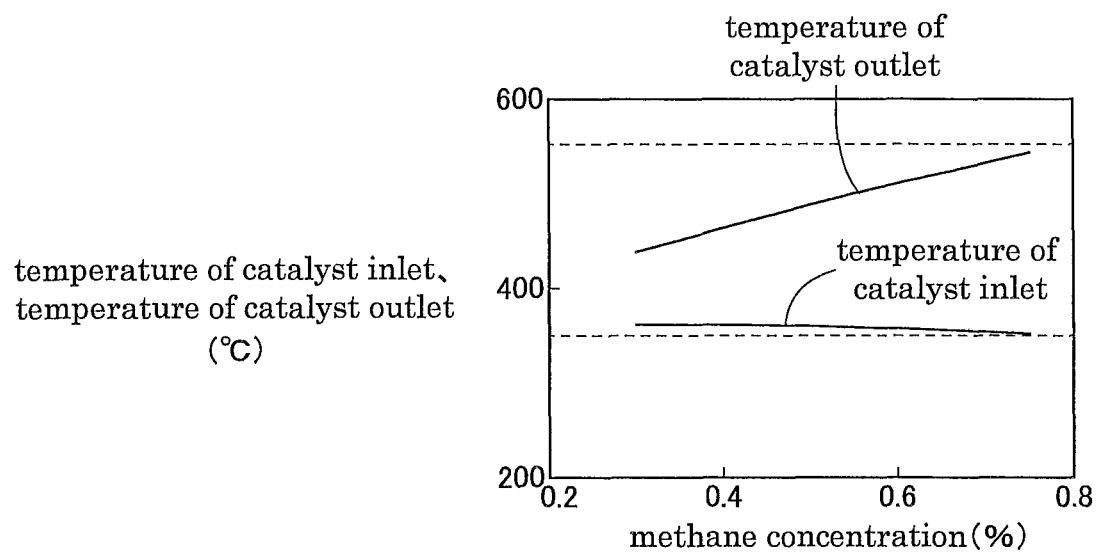
FIG. 17 is a view showing relationship of catalyst inlet and outlet temperatures relative to methane concentrations in case the flow rate ratio to be fed to the shortcut passageway that shortcuts the heat exchanger is increased in accordance with the methane concentration, according to the method of the present invention.

On the other hand, the heat exchanger 3 was controlled such that the flow rate ratio for the shortcut passageway 9 (0% corresponds to the case of no gas being fed to the shortcut passageway 9 and 100% corresponds to the case of the total amount being fed to the shortcut passageway 9, respectively). As a result, it was found that in case the flow rate ratio for the shortcut passageway 9 is controlled as illustrated in FIG. 16, it is possible to maintain the catalyst inlet temperature substantially constant, for the methane concentration ranging from 0.3% to 0.75% and the catalyst outlet temperature can be maintained at 550° C. or lower (FIG. 17).

Figure 13:
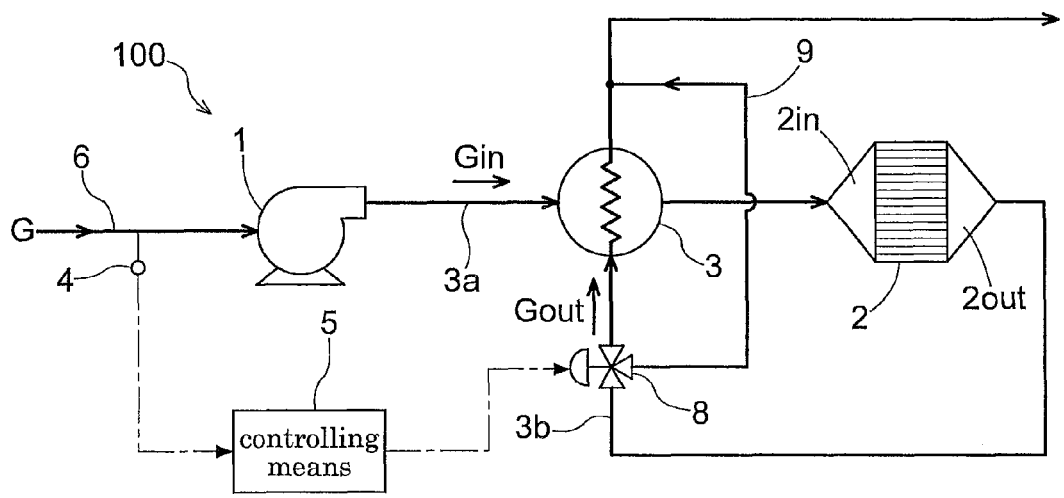
FIG. 13 is a view showing another example of the construction of the methane removing apparatus according to the present invention.

Modified Embodiments of Third Embodiment (1) In the above embodiment, the shortcut passageway 9 shortcutting the heat exchanger 3 was provided in the low temperature passageway 3a of the heat exchanger 3. However, substantially same effect can be achieved also when it is provided in the high temperature passageway 3b of the heat exchanger 3 (see FIG. 13). However, in this case, the flow control valve 8 will be exposed to high temperature. So, there may be a case it should preferably be disposed at the downstream side connection point of the shortcut passageway 9.

(2) Preferably, the methane concentration detecting means 4 should be disposed in close vicinity of the inlet of the apparatus from the viewpoint of detecting variation in the methane concentration as quickly as possible and this detecting means should be disposed within the suction pipe 6 from the viewpoint of detecting the methane concentration of the treatment-object gas. However, it may be provided between the blower 1 outlet and the heat exchanger 3 inlet or between the heat exchanger 3 outlet and the oxidization catalyst 2 inlet.

(3) The low concentration methane removing apparatus according to the present invention may be provided, if necessary, with a determining means for determining gas temperatures at the oxidization catalyst inlet and the oxidization catalyst outlet. With this, it becomes possible to stop the apparatus in a safe manner even when an abnormality occurs in the methane concentration detecting means 4.

INDUSTRIAL APPLICABILITY

In removing methane from a gas which contains the methane at such a low concentration as not to be rendered into a combustible range with whatever ratio of air mixed therewith, it has been made possible to provide a method and an apparatus for removing methane which ensure satisfactory methane removal performance even in the coexistence of sulfur compound and also provide stable removal performance for an extended period of time without performance deterioration even when the methane concentration varies significantly.

DESCRIPTION OF REFERENCE MARKS/NUMERALS

1: blower
2: oxidization catalyst
3: heat exchanger
4: methane concentration detecting means 5: controlling means
6: suction pipe
7: ventilation portion
8: flow control valve
9: shortcut passageway

The invention claimed is:

1. A method of removing low concentration methane from a treatment-object gas which contains the methane at such a low concentration as not to be rendered into a combustible range with whatever ratio of air mixed therewith, the method comprising the steps of:
    feeding the treatment-object gas through a heat exchanger for preheating the treatment-object gas;
    feeding the resultant gas to an oxidization catalyst contact-oxidizing methane for a catalytic oxidation reaction; and
    feeding the resultant reacted gas again through said heat exchanger together with an amount of un-reacted gas for recovery of heat from the reacted gas through heat exchange with the un-reacted gas;
    wherein the method further comprises the step of varying the amount of gas to be fed to the oxidization catalyst in accordance with the concentration of the methane contained in the treatment-object gas in such a manner that the gas rate is increased when the methane concentration is high whereas the gas rate is decreased when the methane concentration is low.

2. The method of removing low concentration methane according to claim 1, wherein the oxidization catalyst comprises iridium and platinum supported on a support comprised of zirconia, titania or a mixture thereof.

3. The method of removing low concentration methane according to claim 1, wherein in connection with a gas treatment amount as a flow rate of the gas to be treated by the oxidization catalyst,
    there is provided, as a first concentration, a methane concentration where the temperature of the oxidization catalyst inlet becomes a permissible lower limit temperature of the oxidization catalyst when the total amount of the treatment-object gas is treated by the oxidization catalyst with the gas treatment amount being kept constant: and
    when the methane concentration of the treatment-object gas is lower than said first concentration, said amount of gas to be fed to the oxidization catalyst is restricted such that the gas treatment amount is decreased in response to reduction in the methane concentration.

4. The method of removing low concentration methane according to claim 1, wherein in connection with a gas treatment amount as a flow rate of the gas to be treated by the oxidization catalyst,
    there is provided, as a second concentration, a methane concentration where the temperature of the oxidization catalyst outlet becomes a permissible upper limit temperature of the oxidization catalyst when the total amount of the treatment-object gas is treated by the oxidization catalyst with the gas treatment amount being kept constant: and
    when the methane concentration of the treatment-object gas is higher than said second concentration, in addition to the treatment-object gas, an amount of air is fed separately to the oxidization catalyst so as to maintain the gas treatment amount constant and the amount of air is increased in response to increase in the methane concentration.

5. The method of removing low concentration methane according to claim 1, wherein the method is implemented under the condition of the temperature of the oxidization catalyst inlet being 350□ or higher and the temperature of the oxidization catalyst outlet being 550□ or lower.

6. The method of removing low concentration methane according to claim 1, wherein the treatment-object gas containing a low concentration of methane comprises a gas discharged from ventilation of a coal mine.

7. An apparatus for removing low concentration methane from a treatment-object gas which contains the methane at such a low concentration as not to be rendered into a combustible range with whatever ratio of air mixed therewith, the apparatus comprising:
    an oxidization catalyst for contact-oxidizing the methane;
    a blower for introducing the treatment-object gas to the oxidization catalyst;
    a heat exchanger for effecting heat exchange between gas prior to its passage through the oxidization catalyst and gas after its passage through the oxidization catalyst;
    a detecting means disposed upstream of the oxidization catalyst and configured for detecting a methane concentration; and
    a controlling means configured to increase a rate of gas to be fed to the oxidization catalyst based on a detection result of the detecting means, if the methane concentration is low, by increasing a blowing rate of the blower.

8. The apparatus for removing low concentration methane according to claim 7, wherein the oxidization catalyst comprises iridium and platinum supported on a support comprised of zirconia, titania or a mixture thereof.

9. The apparatus for removing low concentration methane according to claim 7, wherein
    in connection with the temperature of the oxidization catalyst inlet, in case the low concentration methane removing apparatus above is to be provided with a capability of increasing the temperature range of the treatment object, preferably,
    in connection with a gas treatment amount as a flow rate of the gas to be treated by the oxidization catalyst,
    there is provided, as a first concentration, a methane concentration where the temperature of the oxidization catalyst inlet becomes a permissible lower limit temperature of the oxidization catalyst when the total amount of the treatment-object gas is treated by the oxidization catalyst with the gas treatment amount being kept constant: and
    when the methane concentration of the treatment-object gas is lower than said first concentration, with reduction in the gas amount by control of the blower by the controlling means, said rate of gas to be fed to the oxidization catalyst is restricted such that the gas treatment amount is decreased in response to reduction in the methane concentration.

10. The apparatus for removing low concentration methane according to claim 7, wherein
    in connection with a gas treatment amount as a flow rate of the gas to be treated by the oxidization catalyst,
    there is provided, as a second concentration, a methane concentration where the temperature of the oxidization catalyst inlet becomes a permissible upper limit temperature of the oxidization catalyst when the total amount of the treatment-object gas is treated by the oxidization catalyst with the gas treatment amount being kept constant: and
    when the methane concentration of the treatment-object gas is higher than said second concentration, with increase in the gas amount by control of the blower by the controlling means, in addition to the treatment-object gas, an amount of air is fed separately to the oxidization catalyst so as to maintain the gas treatment amount constant and the amount of air is increased in response to increase in the methane concentration.

11. The apparatus for removing low concentration methane according to claim 7, wherein the heat exchanger is disposed upstream of the oxidization catalyst and the blower is disposed upstream of the heat exchanger;
there is provided a suction pipe for drawing in the treatment-object gas; and
between an outlet of the suction pipe and an inlet of the blower, there is provided a ventilation portion which allows communication of gas with the outside.

12. A method of removing low concentration methane from a treatment-object gas which contains the methane at such a low concentration as not to be rendered into a combustible range with whatever ratio of air mixed therewith, the method comprising the steps of:
feeding the treatment-object gas through a low temperature passageway of a heat exchanger for preheating the treatment-object gas;
feeding the resultant gas through an oxidization catalyst contact-oxidizing methane for a catalytic oxidation reaction;
feeding the resultant reacted gas again through a high temperature passageway of said heat exchanger together with an amount of un-reacted gas for recovery of heat from the reacted gas through heat exchange with the un-reacted gas; and
feeding the resultant gas to a discharging passageway;
wherein a portion of the treatment-object gas to be fed to at least one of the low temperature passageway and the high temperature passageway communicated to the heat exchanger is caused to be fed through a shortcut passageway provided to shortcut the upstream side and the downstream side of said passageway relative to the heat exchanger; whereas the remaining portion of the treatment-object gas is caused to be fed through a passageway communicated to the heat exchanger; and
wherein the ratio of the treatment-object gas to be fed through the shortcut passageway relative to the total amount of the treatment-object passageway to be fed through a passageway communicated to the heat exchanger is set to vary such that the lower the ratio, the lower the concentration of methane in the treatment-object gas, and the higher the ratio, the higher the concentration of methane in the treatment-object gas.

13. The method of removing low concentration methane according to claim 12, wherein the oxidization catalyst comprises iridium and platinum supported on a support comprised of zirconia, titania or a mixture thereof.

14. The method of removing low concentration methane according to claim 12, wherein the oxidization catalyst comprises palladium and platinum supported on a support comprised of zirconia, titania or a mixture thereof.

15. The method of removing low concentration methane according to claim 12, wherein the method is implemented under the condition of the temperature of the oxidization catalyst inlet being 350☐ or higher and the temperature of the oxidization catalyst outlet being 550☐ or lower.

16. The method of removing low concentration methane according to claim 12, wherein the treatment-object gas containing a low concentration of methane comprises a gas discharged from ventilation of a coal mine.

17. An apparatus for removing low concentration methane from a treatment-object gas which contains the methane at such a low concentration as not to be rendered into a combustible range with whatever ratio of air mixed therewith, the apparatus comprising:
an oxidization catalyst for contact-oxidizing the methane;
a blower for introducing the treatment-object gas to the oxidization catalyst;
a heat exchanger for effecting heat exchange between gas prior to its passage through the oxidization catalyst and gas after its passage through the oxidization catalyst;
a shortcut passageway that shortcuts the upstream side and the downstream side of the heat exchanger for at least one of the low temperature passageway and the high temperature passageway communicated to the heat exchanger;
a flow control valve for feeding a portion of the treatment-object gas to the shortcut passageway and feeding the rest of the treatment-object gas to the heat exchanger; and
a controlling means for controlling the ratio of the portion of the treatment-object gas to be fed to the shortcut passageway relative to the total amount of the treatment-object gas to be fed to the passageway such that the lower the methane concentration in the treatment-object gas, the lower the ratio, whereas the higher the methane concentration in the treatment-object gas, the higher the ratio.

18. The method of removing low concentration methane according to claim 17, wherein the oxidization catalyst comprises iridium and platinum supported on a support comprised of zirconia, titania or a mixture thereof.

19. The method of removing low concentration methane according to claim 17, wherein the oxidization catalyst comprises palladium and platinum supported on a support comprised of zirconia, titania or a mixture thereof.

* * * * *

UNITED STATES PATENT AND TRADEMARK OFFICE
CERTIFICATE OF CORRECTION

PATENT NO. : 9,067,175 B2  
APPLICATION NO. : 13/388588  
DATED : June 30, 2015  
INVENTOR(S) : Hirofumi Ohtsuka et al.

Page 1 of 1

It is certified that error appears in the above-identified patent and that said Letters Patent is hereby corrected as shown below:

On the title page, Column 2, OTHER PUBLICATIONS, Line 1, delete "Jog" and insert -- Joo --

Signed and Sealed this  
Fifteenth Day of March, 2016

Michelle K. Lee  
*Director of the United States Patent and Trademark Office*